US006868742B2

(12) United States Patent
Schoeps

(10) Patent No.: US 6,868,742 B2
(45) Date of Patent: Mar. 22, 2005

(54) METHOD AND DEVICE FOR DETERMINING THE TORQUE APPLIED TO THE FASTENER AS A FUNCTION OF THE RETARDATION AND THE INERTIA MOMENT

(75) Inventor: Knut Christian Schoeps, Tyresö (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/475,058

(22) PCT Filed: Apr. 16, 2002

(86) PCT No.: PCT/SE02/00748

§ 371 (c)(1),
(2), (4) Date: Oct. 16, 2003

(87) PCT Pub. No.: WO02/083366

PCT Pub. Date: Oct. 24, 2002

(65) Prior Publication Data

US 2004/0129090 A1 Jul. 8, 2004

(30) Foreign Application Priority Data

Apr. 17, 2001 (SE) .............................................. 0101333

(51) Int. Cl.[7] ............................ G01L 5/24; B25B 23/14
(52) U.S. Cl. .................................. 73/862.21; 73/862.23
(58) Field of Search .............................. 73/862.21, 761, 73/862.22, 862.23, 862.24

(56) References Cited

U.S. PATENT DOCUMENTS 5,092,410 A 3/1992 Wallace et al.
5,181,575 A * 1/1993 Maruyama et al. .......... 173/180
5,567,886 A 10/1996 Kettner
5,637,968 A 6/1997 Kainec et al.
6,134,973 A 10/2000 Schoeps

FOREIGN PATENT DOCUMENTS

EP 0 621 109 A1 10/1994

* cited by examiner

*Primary Examiner*—Edward Lefkowitz
*Assistant Examiner*—Lilybett Martir
(74) *Attorney, Agent, or Firm*—Frishauf, Holtz, Goodman & Chick, P.C.

(57) ABSTRACT

A method and a device for determining the torque magnitude transferred to a threaded fastener at each one of a series of torque impulses delivered to the fastener, includes application of repeated torque impulses on the fastener by a power tool having a motor with a rotor and a pulse unit which intermittently couples the motor to an output shaft. The pulse unit includes an inertia drive member which is accelerated by the motor and transfers its kinetic energy to the output shaft at each torque impulse. A rotation detecting device indicates the instantaneous rotation movement of the inertia drive member. At each impulse generation, the inertia drive member is retarded, and the retardation magnitude as a function of time is calculated. The product of the retardation magnitude and the total inertia moment of the drive member and other rotating parts of the tool forming a rigid unit with the inertia drive member reflects the torque magnitude transferred to the fastener at each impulse.

9 Claims, 2 Drawing Sheets

METHOD AND DEVICE FOR DETERMINING THE TORQUE APPLIED TO THE FASTENER AS A FUNCTION OF THE RETARDATION AND THE INERTIA MOMENT

This application is a U.S. National Phase Application under 35 USC 371 of International Application PCT/SE02/00748 filed Apr. 16, 2002.

BACKGROUND OF THE INVENTION

The invention relates to a method for determining the torque magnitude transferred to a threaded fastener at each one of a number of repeated torque impulses delivered to the fastener by an impulse tool, as well as a device for tightening threaded fasteners by repeated torque impulses, including means for determining the torque transferred to the fastener by determining the retardation magnitude of the rotating parts of the impulse tool.

The invention intends to solve the problem of providing a reliable yet simple technique for determining the torque magnitude transferred to a threaded fastener at each torque impulse delivered by an impulse tool without using a torque transducer and/or an angle sensing means on the output shaft of the impulse tool.

In for instance U.S. Pat. No. 6,134,973 there is described an impulse tool having an output shaft provided with both a torque transducer and an angle encoder. These torque and angle sensing means deliver signals to a control unit where the torque magnitude is determined at the very end of the rotational movement of each impulse, which means that the angle sensor is used for rotational movement indication only. The installed torque is measured by the torque transducer the very instant the fastener stops rotating.

A drawback inherent in this known technique is that the torque transducer arrangement is rather complicated as the output shaft is made of a magneto-strictive material and comprises a portion with a particular surface pattern surrounded by electric coils mounted in the tool housing. Moreover, this torque sensing device together with the angle sensing device add to the length of the output shaft and, hence, the entire tool. A further drawback of this known device is the difficulty to obtain a distortion-free signal from the angle sensor, because the non-rigid socket connection between the shaft and the fastener always tends to cause uneven movements of the output shaft. The step-wise movements of the output shaft during impulse tightening are very short, which means that it is difficult to obtain accurate angle responsive signals.

In U.S. Pat. No. 5,567,886 there is described an impulse tool having a hydraulic pressure activated torque detecting device for tool shut-off purposes and an angle sensing device mounted at the rear end of the motor rotor. The fastener tightening technique described in this prior art document is based on a torque controlled tightening process combined with a result checking step based on the "green window" technique. This means that the torque and angle signals obtained at the end of the tightening process are checked against predetermined limit values for obtaining an o.k.-signal or a not-o.k.-signal.

The technique described in this document is disadvantageous in that it is based on a piston-rod assembly extending out of the hydraulic impulse unit to activate a sensor beam at the rear end of the motor in response to the pressure peaks generated in the impulse unit. A problem concerned with this type of torque sensing device is that seals around movable elements extending out of the hydraulic impulse unit are difficult to get fully leak proof.

SUMMARY OF THE INVENTION

The main object of the invention is to accomplish a technique for determining the torque installed in a fastener in a way where the above discussed prior art problems are avoided.

The torque transferred to the fastener during each impulse consists of two parts, namely the continuously acting drive torque delivered by the motor and the dynamic torque generated during the retardation of the rotating mass of the tool, for instance the inertia drive member of the impulse unit. The dynamic torque generated by retardation of the rotating mass of the tool is the dominating part of the transferred torque.

The delivered torque can be expressed by the formula:

$$M(t)=C_J\cdot\phi''(t)+M_m(t);$$

wherein M(t) is the delivered torque as a function of time, $C_J$ is a constant including the total inertia moment of the inertia drive member and those rotating parts of the tool forming a rigid unit with the inertia drive member, $\phi''(t)$ is the retardation of the rotating parts as a function of time, $M_m(t)$ is the torque delivered by the motor as a function of time.

Since the output torque of the motor is relatively low and has no real influence on the installed torque, the most important factor is the dynamic torque which is dependent on the retardation magnitude and the total inertia moment of the inertia drive member and those rotating parts of the power tool rigidly connected to the drive member. The total inertia moment is usually formed by the inertia moment of the inertia drive member and the inertia moment of the motor rotor, provided the motor rotor is rigidly connected to the inertia drive member. The magnitude of the total inertia moment is related to the actual power tool design. The retardation is expressed as a function of time $\phi''(t)$ and is determined during each impulse generating phase. The higher the retardation magnitude the higher the dynamic torque.

A preferred embodiment of the torque delivering device according to the invention is below described in detain with reference to the accompanying drawing.

DETAILED DESCRIPTION

Figure 1:
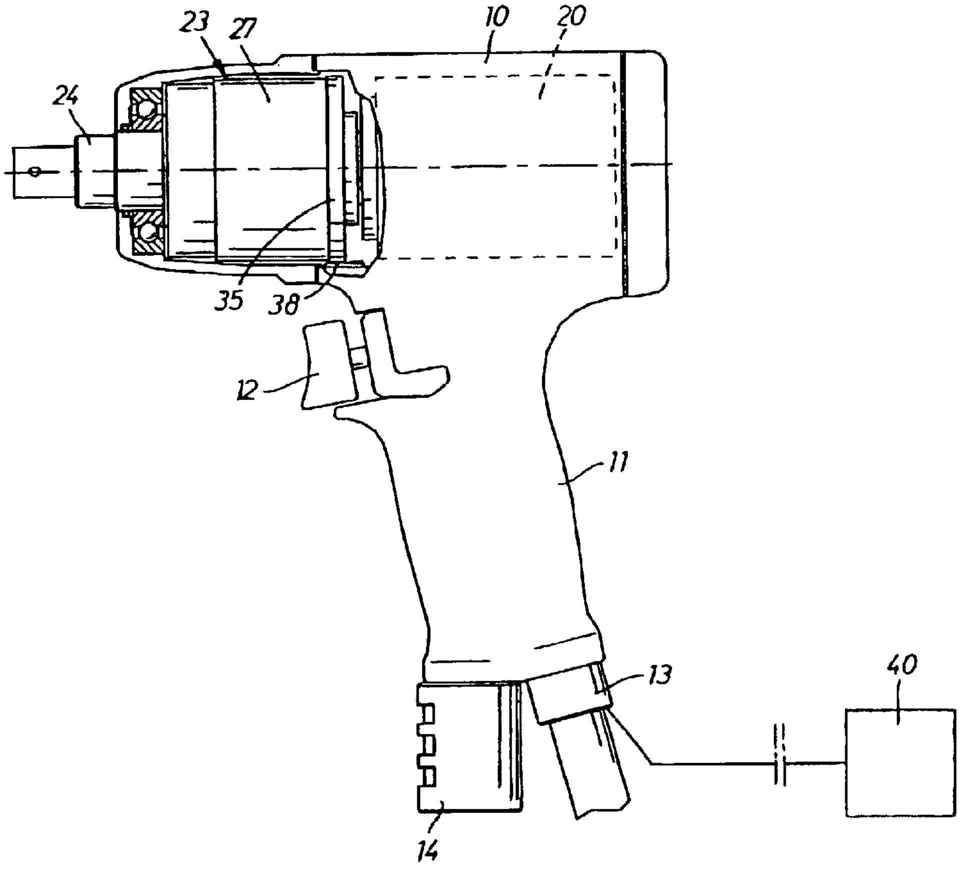
FIG. 1 shows, partly in section, a side view of a torque impulse tool according to the invention.
Figure 2:
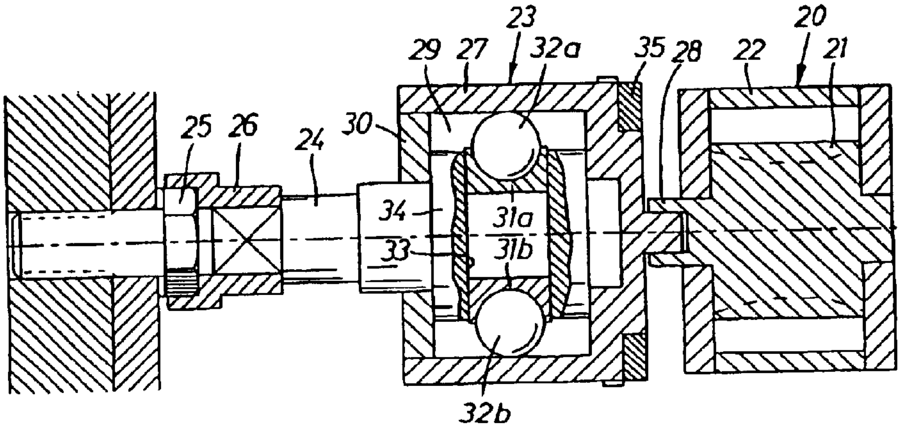
FIG. 2 illustrates schematically a longitudinal section through a torque impulse tool according to the invention in connection with a threaded fastener.

The torque delivering impulse tool schematically illustrated in FIG. 1 comprises a housing 10 with a handle 11, a throttle valve 12, a pressure air inlet connection 13 and an exhaust air outlet 14. As illustrated in FIG. 2, the tool further comprises a pneumatic vane motor 20 with a rotor 21 and a stationary cylinder 22, a torque impulse generating pulse unit 23 with an output shaft 24 for connection to a threaded fastener 25 via a nut socket 26.

The pulse unit 23 consists of a cylindrical inertia drive member 27 which is rigidly connected to the motor rotor 21 and which contains a hydraulic fluid chamber 29. The chamber 29 is partly defined by a front end wall 30 and contains an impulse generating mechanism which is arranged to transfer intermittently the torque from the motor 20 to the output shaft 24. To that end the output shaft 24 is formed with a rear end portion 34 which extends into the hydraulic fluid chamber 29 to receive torque impulses from the impulse generating mechanism. The latter comprises two opposed pistons 31*a*, 31*b* which are reciprocated by two activation balls 32*a*, 32*b* in a transverse bore 33 in the output shaft 24. The balls 32*a*, 32*b* engage a non-illustrated cam surface on the inner cylindrical surface of the drive member 27. The pistons 31*a*, 31*b* form between them in the bore 33 a high pressure chamber for generating torque impulses.

This type of pulse unit is previously described in for instance U.S. Pat. No. 5,092,410 and is not described in further detail since it does not form a part of the invention.

Figure 3A:
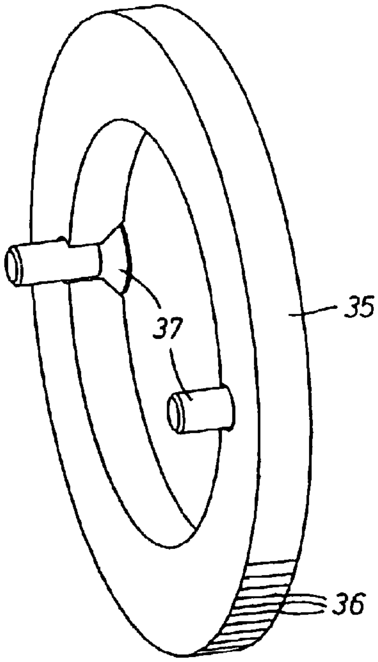
FIG. 3*a* shows a perspective view of a ring element forming part of the rotation detecting device of the tool in FIG. 1.
Figure 3B:
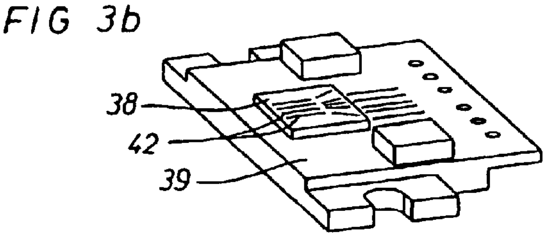
FIG. 3*b* shows a perspective view of a sensor unit forming part of the rotation detecting device.

In order to detect the rotational movement and to be able to calculate the retardation magnitude of the rotating parts of the torque delivering tool, the inertia drive member 27 is provided with a ring element 35 of a resinous material which is magnetised in a large number of parallel bands 36 representing magnetic poles equidistantly distributed throughout the circumference of the ring element 35. See FIG. 3*a*. As illustrated in FIG. 2, the ring element 35 is secured to the inertia drive member 27 by two screws 37 and forms a rigid unit with the inertia drive member 27, which means that the inertia moment of the ring element 35 contributes to the total inertia moment of the rotating parts of the tool.

The angle encoder further comprises a stationary sensor unit 38 which is located on a circuit board 39 and which is arranged to detect the rotation of the inertia drive member 27 as a movement of the magnetic bands 36 of the ring element 35 past the sensor unit 38. The circuit board 39 is secured to the tool housing 10 which also contains power supply means connected to the motor 20. The sensor unit 38 is arranged to deliver signals in response to the number of passing magnetised bands 36, and an external control unit 40 connected to the sensor unit 38. The control unit 40 includes calculating means for determining the retardation magnitude of the rotating parts from the signals received from the sensor unit 38 and from the total inertia moment value as a tool related constant.

The sensor unit 38 comprises a number of elongate sensing loops 42 arranged in parallel and spaced relative to each other at a distance different from the spacing of the magnetised bands 36 on the ring element 35 so as to obtain phase delayed signals from the sensor unit 38. By this phase delay it is possible to determine in which direction the inertia member 27 is rotating.

The above described angle encoder does not in itself form any part of the invention, but is chosen from a number of more or less suitable devices for this purpose. The described angle encoder, however, is particularly suitable for this application since it has a rugged design and provides a very good angle resolution. It is commercially available as a Series EK 622 Encoder Kit from the U.S.-based company Admotec (Advanced Motion Technologies).

In operation, the output shaft 24 is connected to the threaded fastener 25 via nut socket 26, and the motor 20 is supplied with motive pressure air so as to deliver a driving torque to the pulse unit 23. As long as the torque resistance from the fastener 25 is below a certain level, the pulse unit 23 will forward the continuous motor torque directly to the output shaft 24, without generating any impulses. When the fastener 25 is properly run down and the torque resistance increases above this certain level, the pulse unit 23 starts converting the continuous motor torque into impulses. This means that the inertia drive member 27 is repeatedly accelerated during almost a full revolution to deliver the kinetic energy obtained during that accelerating phase to the output shaft 24 by means of the impulse mechanism 23. The torque delivered via this kinetic energy is several times higher than the continuous torque delivered by the motor 20 and will accomplish a step-by-step tightening of the fastener 25.

The kinetic energy delivered to the fastener 25 is a product of the retardation magnitude and the total inertia moment of the rotating parts of the tool, i.e. the drive member 27 and those other parts forming a rigid unit with the drive member 27, as the motor rotor 21 and the ring element 35. This total inertia moment is a constant for the actual tool design and can be determined once and for all, whereas the retardation magnitude varies with the torque actually delivered to the fastener 25. By detecting the movement of the rotating parts by means of the magnetised ring element 35 and the movement detecting sensor unit 38, the rotation speed as well as the retardation magnitude of the rotating parts may be calculated, and by using the retardation magnitude thus calculated and the total inertia moment of the rotating parts of the tool, the torque transferred to the fastener 25 may be determined.

It should be noted that the embodiments of the invention are not limited to the described example but can be freely varied within the scope of the claims. For instance, the means for determining the rotational movement, speed and retardation of the inertia drive member could be freely chosen, provided there is obtained a good enough signal accuracy. It might be possible to use an accelerometer attached directly on the inertia drive member.

Neither is the invention limited to embodiments comprising pneumatic motors, but could as well relate to embodiments involving electric motors. However, in such embodiments the motor rotor is not rigidly connected to the inertia drive member. In order to prevent momentary stand stills and hence undesirable current peaks in the motor drive system, there is usually incorporated an elastically yielding coupling between the motor and the inertia drive member.

This means that the inertia moment of the motor rotor does not form any part of the total inertia moment, and does not take any essential part in the impulse generating process.

What is claimed is:

1. A method for determining a torque magnitude transferred to a threaded fastener at each one of a series of torque impulses delivered to the fastener by a torque impulse tool which includes a torque delivering rotation motor with a rotor, an output shaft connectable to the fastener, and an impulse unit intermittently coupling said motor to said output shaft, wherein said impulse unit comprises an inertia drive member connected to said motor rotor, said method comprising:

determining a retardation magnitude of said inertia drive member during each impulse generating phase, calculating a magnitude of dynamic torque delivered to the fastener by said inertia drive member during each impulse generating phase as a function of said determined retardation magnitude and a total inertia moment of said inertia drive member and rotating parts of the impulse tool which form a rigid unit with said inertia drive member, and calculating a magnitude of installed torque in the threaded fastener as a sum of torque delivered by said motor and the dynamic torque delivered by the total inertia moment of said inertia drive member and the rotating parts of the impulse tool which form a rigid unit with said inertia drive member.

2. The method according to claim 1, wherein said retardation magnitude is determined by detecting an angular displacement per time unit of said inertia drive member, and by calculating variations of an instantaneous angular speed per time unit of said inertia drive member.

3. A method for determining a torque magnitude transferred to a threaded fastener at each one of a series of torque impulses delivered to the fastener by a torque impulse tool which includes a torque delivering rotation motor with a rotor, an output shaft connectable to the fastener, and an impulse unit intermittently coupling said motor to said output shaft, wherein said impulse unit comprises an inertia drive member connected to said motor rotor, said method comprising:

detecting an angular displacement of said inertia drive member during each impulse generation phase, determining an instantaneous angular speed of said inertia drive member during each impulse generating phase, determining a retardation magnitude of said inertia drive member during each impulse generating phase, calculating a magnitude of dynamic torque delivered to the fastener by said inertia drive member during each impulse generating phase as a function of said determined retardation magnitude and a total inertia moment of said inertia drive member and rotating parts of the impulse tool which form a rigid unit with said inertia drive member, and calculating a magnitude of torque transferred to the threaded fastener as a sum of torque delivered by said motor and the dynamic torque delivered by said total inertia moment of said inertia drive member and the rotating parts of the impulse tool which form a rigid unit with said inertia drive member.

4. A toroue impulse delivering device for tightening threaded fasteners, comprising:

a housing, a torque delivering rotation motor with a rotor, an output shaft connectable to a threaded fastener, an impulse unit coupling intermittently said motor rotor to said output shaft, wherein said impulse unit comprises an inertia drive member rigidly connected to said motor rotor, and a control unit having data storing and processing capacity, and a rotation detecting device provided between said inertia drive member and said housing, connected to said control unit, and arranged to deliver signals to said control unit in response to an angular displacement of said inertia drive member during each impulse generating phase, wherein said control unit is adapted to calculate:

a retardation magnitude of said inertia drive member during each impulse generating phase, a dynamic torque transferred to the fastener at each delivered torque impulse as a function of said calculated retardation magnitude and a total inertia moment of said motor rotor and said inertia drive member, and a torque transferred to the threaded fastener as a sum of torque delivered by said motor and the dynamic torque delivered by said inertia drive member and said motor rotor at said determined retardation magnitude.

5. The device according to claim 4, wherein said rotation detecting device comprises a ring element sequentially magnetised to provide a number of magnetic poles equidistantly distributed along a periphery of the ring element, wherein said ring element is rigidly secured to said inertia drive member in a co-axial disposition, and wherein a sensor unit is secured to said housing and arranged to deliver signal pulses in response to a passing of said magnetic poles during an angular displacement of said ring element and said inertia drive member.

6. The device according to claim 5, wherein said control unit is located inside said housing.

7. A method for determining a torque magnitude installed in a threaded fastener at each one of a series of torque impulses delivered by a torque impulse generating tool system which includes a rotation motor with a rotor, an output shaft, and an impulse unit including an inertia drive member connected to the motor rotor, said method comprising:

detecting an angular displacement of the inertia drive member;

determining a retardation magnitude of the inertia drive member during each impulse generating phase; and calculating the magnitude of the torque transferred to the threaded fastener during each impulse generating phase as a function of the determined inertia drive member retardation magnitude and a predetermined inertia related tool system factor specific to the impulse tool system.

8. A torque impulse tool system for tightening threaded fasteners, comprising:

a rotation motor with a rotor;

an output shaft;

an impulse unit comprising an inertia drive member connected to the motor rotor, and a control unit including data storing and processing capacity; and a rotation detecting device arranged to deliver signals in response to an angular displacement of the inertia drive member;

wherein the control unit comprises:

means for receiving signals from the rotation detecting device;

means for determining a retardation magnitude of the inertia drive member; and means for calculating a magnitude of torque transferred to the threaded fastener as a function of the determined inertia drive member retardation magnitude and a predetermined inertia related tool system factor specific to the impulse tool system.

9. The tool system according to claim 8, wherein the rotation detecting device comprises:

a ring element rigidly coupled to the inertia drive member and sequentially magnetized to provide a number of magnetized poles equidistantly distributed along a periphery of the ring element; and a stationary sensor unit secured in a proximate relationship to said ring element and arranged to deliver signals in response to a passing of the magnetic poles during angular displacement of the inertia drive member and the ring element.

* * * * *